(12) United States Patent
Chen et al.

(10) Patent No.: US 11,889,835 B2
(45) Date of Patent: Feb. 6, 2024

(54) PLANT GROWTH REGULATOR OF ELEVATING ANTI-STRESS ABILITY AND USE THEREOF

(71) Applicant: GenMont Biotech Incorporation, Tainan (TW)

(72) Inventors: Yi-Hsing Chen, Tainan (TW); Wan-Hua Tsai, Kaohsiung (TW); Tsuei-Yin Huang, Tainan (TW); Hsiang-En Huang, Taitung (TW); Yu-Jen Hsu, Chiayi (TW)

(73) Assignee: GENMONT BIOTECH INCORPORATION, Tainan (TW)

(*) Notice: Subject to any disclaimer, the term of this patent is extended or adjusted under 35 U.S.C. 154(b) by 143 days.

(21) Appl. No.: 16/362,780

(22) Filed: Mar. 25, 2019

(65) Prior Publication Data
US 2019/0320659 A1  Oct. 24, 2019

(30) Foreign Application Priority Data
Mar. 26, 2018 (CN) .......................... 201810252850.9

(51) Int. Cl.
*A01N 63/20* (2020.01)
(52) U.S. Cl.
CPC .................................. *A01N 63/20* (2020.01)
(58) Field of Classification Search
None
See application file for complete search history.

(56) References Cited

U.S. PATENT DOCUMENTS

| | | | | |
|---|---|---|---|---|
| 2006/0067921 A1* | 3/2006 | Conway | ................. | A61P 31/12 435/252.9 |
| 2015/0238548 A1* | 8/2015 | Huang | ..................... | C12N 1/20 424/93.45 |
| 2017/0258708 A1* | 9/2017 | Kaesler | ................ | A61K 8/0216 |

FOREIGN PATENT DOCUMENTS

| | | |
|---|---|---|
| CN | 1696281 A | 11/2005 |
| CN | 101032257 A | 9/2007 |
| CN | 103596435 A | 2/2014 |
| CN | 104017746 A | 9/2014 |
| CN | 104284975 A | 1/2015 |
| CN | 107043728 A | 8/2017 |
| KR | 20170075965 A | 7/2017 |
| TW | I284149 B | 7/2007 |
| TW | 1607758 B | 12/2017 |
| WO | WO-2014172758 A1 * | 10/2014 ........... A61K 35/747 |

OTHER PUBLICATIONS

Ajar Nath Yadav, Beneficial microbiomes: Biodiversity and potential biotechnological applications for sustainable agriculture and human health, 2017, Journal of Applied Biology & Biotechnology, vol. 5(6), pp. 45-57 (Year: 2017).*

Narasimha Murthy Konappa, Lactic acid bacteria mediated induction of defense enzymes to enhance the resistance in tomato against Ralstonia solanacearum causing bacterial wilt, 2016, Scientia Horticulturae, 207, pp. 183-192 (Year: 2016).*

Juliana Fonseca Moreira da Silva, "Use of Probiotics to Control Aflatoxin Production in Peanut Grains", Jun. 28, 2015, The Scientific World Journal, vol. 2015, Article ID 959138, 8 pages, https://doi.org/10.1155/2015/959138 (Year: 2015).*

Sanju Kunwar, Colletotrichum gloeosporioides, Dec. 16, 2014, University of Florida, Bugwoodwiki https://wiki.bugwood.org/Colletotrichum_gloeosporioides (Year: 2014).*

Hong Lei et al, Studies on antimicrobial substance produced by Lb. paracasei HD 1.7, Industrial Microbiology, Aug. 2007, pp. 16-19, vol. 37, No. 4, Harbin Medical University, Harbin, China.

* cited by examiner

*Primary Examiner* — Abigail Vanhorn
*Assistant Examiner* — Ali S Saeed
(74) *Attorney, Agent, or Firm* — Lippes Mathias LLP

(57) ABSTRACT

The present invention relates to a plant growth regulator of elevating anti-stress ability and use thereof. The plant growth regulator, which is consisted of *Lactobacillus* fermenting culture solution, has excellent thermostability and safety without any side effect, significantly elevating ability against biotic and abiotic stresses. Therefore, the *Lactobacillus* fermenting culture solution can be applied as the plant growth regulator or a use in preparation of a composition for elevating anti-stress ability of a plant.

8 Claims, 14 Drawing Sheets
(6 of 14 Drawing Sheet(s) Filed in Color)
Specification includes a Sequence Listing.

PLANT GROWTH REGULATOR OF ELEVATING ANTI-STRESS ABILITY AND USE THEREOF

RELATED APPLICATIONS

This application claims benefit of priority from China Patent Application No. 201810252850.9, filed on Mar. 26, 2018, the entirety of which is incorporated by reference herein.

A sequence listing is being submitted herein as an ASCII text file with the name "Sequence_Listing.txt", created on Mar. 22, 2019, with a file size of 3,237 bytes. The material in this text file is hereby fully incorporated by reference herein.

BACKGROUND

Field of Invention

The present invention refers to a plant growth regulator and a use thereof, and particularly to a natural plant growth regulator of elevating anti-stress ability and a method for elevating anti-stress ability of a plant using a plant growth regulator composition including *Lactobacillus* fermenting culture solution.

Description of Related Art

During the growth, plants were often subjected to the influence from biotic and abiotic stresses, and even go through a crop throughput drop in severe cases which causes economic losses in agriculture. In general, a biotic stresses mostly cause from pathogen infection, and infected plants would be gradually etiolated, rotten, withered and even dead. Abiotic stresses, such as high temperature, cold damage, drought, high salinity, radiant irradiation and so on, might change plant growth process and generate excessive reactive oxygen species (ROS), thus causing the oxidization stress, or even death in the severe cases.

Currently, in most conditions chemical pesticides or fertilizers were applied to help the plant against the aforementioned stresses. However, residues of the chemical pesticides or fertilizers would lead to contamination, so it is truly an important issue to develop non-chemical pesticides or fertilizers for helping crops against the stresses.

Probiotics have been developed for a long time, which is safe without side effect, and previous researches have indicated that *Lactobacillus* of specific strains is capable of inhibiting pathogens. For example, *Lactobacillus plantarum* can inhibit the growth of plant pathogens such as black rot pathogen (*Xanthomonas campestris*), *Fusarium* wilt pathogen (*Fusarium oxysporum*), and *Phytophthora* blight pathogen (*Phytophthora drechsleri* Tucker); fermenting solutions of *Lactobacillus casei, L. rhamnosus, L. fermentum, L. reuteri*, and *Lactobacillus plantarum* can inhibit anthracnose pathogen (*Colletotrichum gloeosporioides*) and gray mold disease (*Botrytis cinerea*). However, without empirical researches, it is not able to predict whether those probiotics can elevate the ability of different plants against biotic and abiotic stresses, therefore it is still necessary to look for a better plant growth regulator.

In view of this, it is indeed necessary to provide a plant growth regulator so as to facilitate elevating the acquired anti-stress ability of plants and thus help plants against stresses or even elevate their ability of adapting to climate changes.

SUMMARY

Therefore, one aspect of the present invention provides a plant growth regulator of elevating anti-stress ability, which is consisted of *Lactobacillus* fermenting culture solution.

Another aspect of the present invention provides a method for elevating anti-stress ability of a plant using a plant growth regulator composition including *Lactobacillus* fermenting culture solution, in which a whole body, a portion, and/or a culture medium of a plant is treated with the aforementioned *Lactobacillus* fermenting culture solution in order to elevate the ability against biological or abiotic stress of the plant.

According to the aforementioned aspects of the present invention, a plant growth regulator of elevating anti-stress ability is provided, which is consisted of the *Lactobacillus* fermenting culture solution.

In the aforementioned embodiment, the *Lactobacillus* fermenting culture solution originates from *Lactobacillus paracasei* GMNL-32 that is deposited with an accession number of CCTCC M 204012 in China Center for Type Culture Collection (CCTCC), Wuhan University, Wuhan 430072, People's Republic of China, on Feb. 19, 2004. *Lactobacillus paracasei* GMNL-32 is also deposited with an accession number of BCRC 910220 in Bioresource Collection and Research Center (BCRC) of Food Industry Research and Development Institute (FIRDI) at No. 331 on Shih-pin Road, Hsinchu County, Taiwan, on Mar. 19, 2003.

In one embodiment of the present invention, the aforementioned *Lactobacillus* fermenting culture solution can include, for example, viable or dead bacteria of the *Lactobacillus paracasei* GMNL-32.

According to another aspect of the present invention, a method for elevating anti-stress ability of a plant using a plant growth regulator composition including *Lactobacillus* fermenting culture solution is provided, which includes that a whole body, a portion, and/or a culture medium of a plant is treated with the aforementioned *Lactobacillus* fermenting culture solution, so as to elevate the ability of the plant against biotic or abiotic stress.

In one embodiment of the present invention, the aforementioned plant can be, for example, a dicot or a monocot. In one example, the aforementioned dicot is Solanaceae species or Caricaceae species.

In one embodiment of the present invention, the aforementioned biotic stress can include the infection of pathogen. In one example, the aforementioned pathogen includes Solanaceae species and Caricaceae species.

In one embodiment of the present invention, the aforementioned abiotic stress can be, for example an elevated temperature of at least 45° C., UV, and at least 14 days of drought.

By applying the plant growth regulator of elevating the anti-stress ability of the present invention, which consists of the fermenting culture solution of *Lactobacillus paracasei*, and provides excellent thermal stability, security, and no side effect, the ability of the plant against biotic and abiotic stresses can be significantly elevated. Therefore, the *Lactobacillus* fermenting culture solution can be applied as the plant growth regulator or a method for elevating anti-stress ability of a plant using a plant growth regulator composition including *Lactobacillus* fermenting culture solution.

BRIEF DESCRIPTION OF THE DRAWINGS

The patent or application file contains at least one drawing executed in color. Copies of this patent or patent application publication with color drawing(s) will be provided by Office upon request and payment of the necessary fee. The disclosure can be more fully understood by reading the following detailed description of the embodiment, with reference made to the accompanying drawings as follows.

DETAILED DESCRIPTION

Figure 1A:
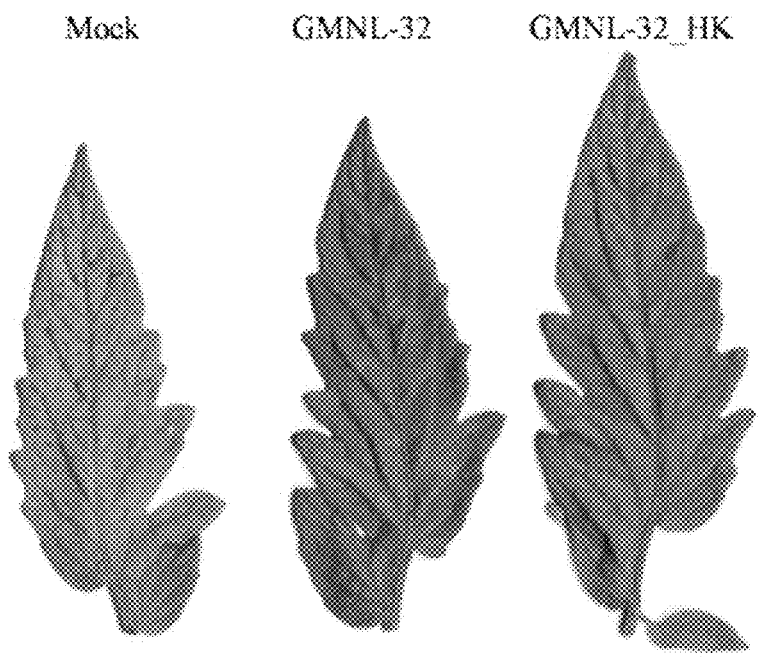
FIGS. 1A and 1B show a leaf appearance (FIG. 1A) and a bar diagram of lesion numbers per leaf (FIG. 1B) of a tomato plant treated with a plant growth regulator and then inoculated with *Colletotrichum gloeosporioides* in accordance with one embodiment of the present invention.

Singular forms, "a", "an", and "the", as mentioned in the present invention also cover plural references, unless otherwise stated in the context. A value range (such as 10% to 11% of A) includes its upper and lower limits (i.e. $10\% \leq A \leq 11\%$) if not otherwise stated specially; the value range, for which if no lower limit is defined (such as B lower than 0.2%, or B below 0.2%), can have a lower limit of zero (i.e. $0\% \leq B \leq 0.2\%$). The aforementioned terms were used for illustrating and helping understand the present invention rather than limiting the scope thereof.

The present invention provides a plant growth regulator of elevating anti-stress ability and a method for elevating anti-stress ability of a plant using a plant growth regulator composition including *Lactobacillus* fermenting culture solution, which is consisted of *Lactobacillus* fermenting culture solution and can significantly elevate the ability of the plant against biotic and abiotic stresses.

In an embodiment, the aforementioned *Lactobacillus* fermenting culture solution originates from *Lactobacillus paracasei* GMNL-32. Specifically, the aforementioned *Lactobacillus paracasei* GMNL-32 refers to a strain deposited with an accession number of CCTCC M 204012 in China Center for Type Culture Collection (CCTCC), Wuhan University, Wuhan 430072, People's Republic of China, on Feb. 19, 2004. *Lactobacillus paracasei* GMNL-32 is also the strain deposited with an accession number of BCRC 910220 in Bioresource Collection and Research Center (BCRC) of Food Industry Research and Development Institute (FIRDI) at No. 331 on Shih-pin Road, Hsinchu County, Taiwan, on Mar. 19, 2003.

In the aforementioned embodiment, the aforementioned *Lactobacillus* fermenting culture solution can include, for example, the viable or dead bacteria of the *Lactobacillus paracasei* GMNL-32.

During the use, the aforementioned *Lactobacillus* fermenting culture solution can be used in the use of manufacturing a plant growth regulator composition elevating the anti-stress ability. In one embodiment of the present invention, the aforementioned *Lactobacillus* fermenting culture solution can be treated to the whole body, portion, and/or culture medium of a plant through non-invasive methods (such as spraying, air exhaust and inoculation, soaking, etc.) or invasive methods (such as treatments through notches or wounds, etc.), whereby to elevate the ability of the plant against biotic or abiotic stress.

The elevation of anti-stress ability of a plant here mentioned in the present invention can include but be not limited to elevation of the ability of the plant against biotic or abiotic stress.

In the aforementioned embodiments, there is no special limitation on types of plants. However, in some examples, the aforementioned plants can be, for example, a dicot or a monocot, in which the dicot can be a Solanaceae plant (specific examples thereof can be tomato) or Caricaceae plant (specific examples thereof can be *papaya*), while specific examples of the monocot can be rice.

In the aforementioned embodiment, there is no special limitation on types of culture media. However, in some examples, specific examples of the aforementioned culture media can include but be not limited to water, soil, cultivable soil, expanded clay, bark, artificial soil, granulate sponge, vermiculite, nacrite, fern chip, zeolite, sphagnum moss, or any combination thereof.

In the present invention, biotic stresses mentioned herein can include the infection of pathogen, but types of the aforementioned pathogen depend on the plant types without particular limiting thereto in the present invention. In one example, the aforementioned pathogen can include but be not limited to *Colletotrichum* species and *Pseudomonas* species, wherein specific examples of the *Colletotrichum* species can include but be not limited to *Colletotrichum gloeosporioides*, and specific examples of the *Pseudomonas* species can include but be not limited to *Pseudomonas syringae* pv. Tomato and non-virulent variety of *Pseudomonas syringae* pv. Tomato.

In the present invention, the abiotic stress mentioned herein can include a variety of environments not suitable for plant growth, specific examples of which can include but be not limited to a temperature of at least 45° C., UV, and at least 14 days of drought, but the present invention is not limited thereto.

In the present invention, the elevation of anti-stress ability mentioned previously can also include but be not limited to improving the acquired anti-stress ability of plants through elevating the ability of rhizobacteria wrapping around the plant root, elevating the internal hydrogen peroxide content and peroxidase activity of the plant, elevating the anti-disease gene expression of the plant (such as promoting the expression level of relevant genes of jasmonic acid (JA) and salicylic acid (SA) inside the plant) and other mechanisms.

In one embodiment of the present invention, the aforementioned plant growth regulator can be, for example, in a dosage form of liquid, powder, paste, bulk, pastille, capsule, or in combination with other suitable carriers, but the present invention is not limited to the forms listed herein. In addition, the aforementioned plant growth regulator has the *Lactobacillus* fermenting culture solution as an effective component, and can optionally added with other various conventional inactive components depending on real requirements.

In one embodiment of the present invention, there is no special limitation on the bacterium concentration of the aforementioned plant growth regulator, depending on the plant type and treating site. For example, in the example of application onto the leaf, the *Lactobacillus* fermenting culture solution (10-fold dilution of stock solution) can be treated onto the leaf surface by spraying for at least 10 times, or the *Lactobacillus* fermenting culture solution (bacteria solution concentration of $10^7$ CFU/mL) can be treated onto the leaf surface by air-exhausting inoculation. In the example of application into soil, 150 mL of *Lactobacillus* fermenting culture solution (10-fold dilution of stock solution) can be dosed into 2 kg of soil as a single effective dosage, but the present invention is not limited thereto.

The content below illustrates the application of the present invention by using several embodiments rather than limiting the present invention. One of ordinary skills in the art of the present invention can take various modification and changes without departing from the spirit and scope of the present invention.

Example 1. Preparing Plant Growth Regulator by Using *Lactobacillus Paracasei* GMNL-32

Examples hereinafter provide the assessments of the bacteriological characteristics of the *Lactobacillus paracasei* (GMNL-32).

1. Mycological Feature of *Lactobacillus paracasei* GMNL-32

*Lactobacillus paracasei* GMNL-32 was originally isolated from healthy human gastrointestinal tracts, the appearance and physiological characteristics were disclosed in Taiwan Publication Patent No. 1284149, which was incorporated herein as the reference.

Next, the *Lactobacillus paracasei* GMNL-32 was identified as *Lactobacillus paracasei* upon a set of API 50 CHI V5.1 identification and analysis (not shown in figure).

In addition, after extracting the total RNA of *Lactobacillus paracasei* GMNL-32 by conventional methods, a partial sequence of 16S rRNA gene (an forward primer was PAF primer, and a reverse primer was 536R primer) was amplified by a pair of primers such as SEQ ID NOs: 1 and 2, in which a resultant nucleic acid fragment was as shown as the SEQ ID NO: 3. The method of extracting the total RNA was well known by one of ordinary skills in the art of the present invention rather than repeatedly reciting it.

In comparison to the GenBank of the National Center for Biotechnology Information (NCBI), this nucleic acid fragment was also identified as *Lactobacillus paracasei*.

2. Preparing Plant Growth Regulator

*Lactobacillus paracasei* GMNL-32 was cultured into a 5 L fermenter overnight, and the fermenting culture solution (bacteria number of around $10^6$ CFU/mL to around $10^9$ CFU/mL) was collected as the fermentation culture stock solution of *Lactobacillus paracasei* GMNL-32.

The aforementioned *Lactobacillus paracasei* GMNL-32 fermentation culture stock solution was then thermally sterilized under high temperature (90° C. to 121° C.) for 15 minutes to 30 minutes, for producing a thermally sterilized fermenting culture solution of the *Lactobacillus paracasei* GMNL-32.

The aforementioned fermentation culture stock solution was diluted 10 times with water, for generating a fermenting culture solution of *Lactobacillus paracasei* GMNL-32 (hereinafter abbreviated as GMNL-32), or a thermally sterilized fermenting culture solution of *Lactobacillus paracasei* GMNL-32 fermenting culture solution (hereinafter abbreviated as GMNL-32_HK) respectively, so as to further assess the effects of the two solutions as plant growth regulators.

Example 2. Assessment of Effect of Plant Growth Regulator of Elevating Anti-Stress Ability 1. Assessment of Effect of Plant Growth Regulator of Elevating Anti-Biotic Stress Ability of Tomato Plant 1.1 Inoculation of Plant Pathogen A tomato plant (*Solanum lycopersicum*, a 4 to 5 week-old variety of Known-You 301 available from Known-You Seed Co., Ltd., Taiwan) was used in this Example, of which a leaf in the field was firstly treated with the *Lactobacillus paracasei* GMNL-32 fermenting culture solution or *Lactobacillus paracasei* GMNL-32 thermally sterilized fermenting culture solution of Example 1 for 11 times and then inoculated with the plant pathogen as below, respectively.

Figure 1B:
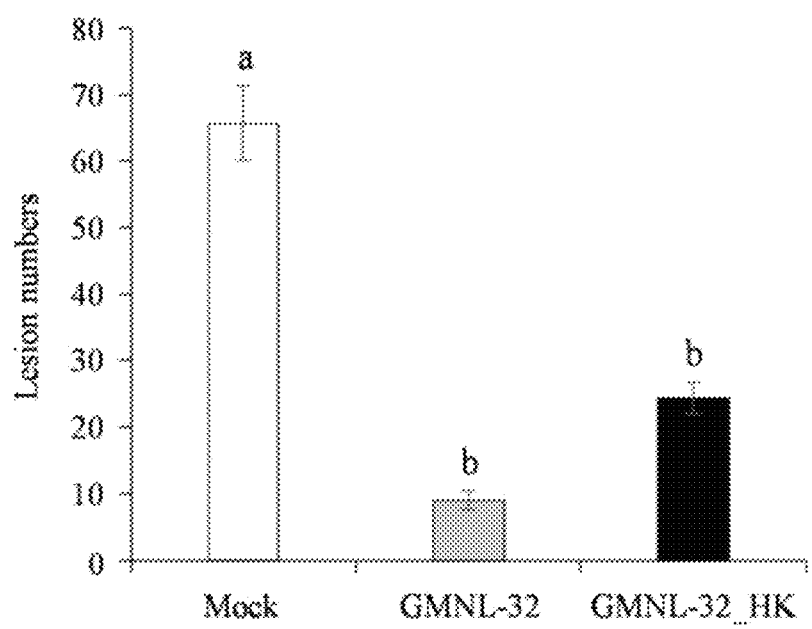

*Colletotrichum gloeosporioides* (the pathogen of the tomato anthracnose) was cultured in a ⅕ Potato-Dextrose-Agar (PDA) culture medium, vibrated in a 5 mL of 0.1% water agar (WA) culture medium containing 0.05% Tween 20 for 5 minutes, and then calculated for its conidium number by using a hemocytometer. Next, the conidia were adjusted into a concentration of $10^6$ spores/mL (including ⅕ Potato Dextrose Broth (PDB) and 10 mM $MgSO_4$), and sprayed and inoculated onto the tomato leaf that was treated with the *Lactobacillus paracasei* GMNL-32 fermenting culture solution or *Lactobacillus paracasei* GMNL-32 thermally sterilized fermenting culture solution. 5 days later since inoculation, the plant appearance was photographed and calculated for the lesion numbers per leaf, in which a black necrotic spot of leaf represented a lesion, as shown in FIGS. 1A and 1B.

In addition, *Pseudomonas syringae* pv. Tomato DC3000 (Pst DC3000, causing the tomato bacterial blight) and the non-virulent strain of *Pseudomonas syringae* pv. Tomato Pst DC3000 avrRpt2 were cultured in a King's medium B (KBM) containing 50 ppm of rifampicin and a KBM containing 50 ppm of rifampicin and kanamycin, respectively, adjusted to a bacteria solution with a concentration of $10^7$ CFU/mL using RO water, and inoculated onto the tomato leaf that was treated with the *Lactobacillus paracasei* GMNL-32 fermenting culture solution or *Lactobacillus*

*paracasei* GMNL-32 thermally sterilized fermenting culture solution through a method of inoculation by suction. 4 days later since inoculation, the plant appearance was photographed and calculated for the lesion number per leaf, as shown in FIGS. 2A to 2D.

The aforementioned resultant data was expressed by an average value (mean)±standard deviation (SD), statistically analyzed by using commercial statistic software (such as SPSS 12.0), compared by the one-way analysis of variance for group deviations, and compared by the Duncan's multiple range method for significant differences. Letters a and b, c in FIGS. 1B, 2B, and 2D represented a respective statistical result respectively, in which different letters represented a statistically significant difference (p<0.05) between groups, while the same letter represented that there was no statistically significant difference (p>0.05) between groups.

1.2 Assessment of Effect of Plant Growth Regulator of Elevating Anti-*Colletotrichum* Ability of Tomato Plant Referring to FIGS. 1A and 1B, these figures show a leaf appearance (FIG. 1A) and a bar diagram of lesion numbers per leaf (FIG. 1B) of a tomato plant treated with a plant growth regulator and then inoculated with *Colletotrichum gloeosporioides* in accordance with one embodiment of the present invention. In FIG. 1B, mock represented leaf appearance of a plant without treatment of plant growth regulator but inoculated with *Colletotrichum gloeosporioides.*

It was shown by the mock group results in FIGS. 1A and 1B that after a tomato leaf was sprayed with *Colletotrichum gloeosporioides* for 5 days, the leaf indeed would be etiolated (as shown in FIG. 1A) and had black rot lesions (FIGS. 1A and 1B) occur thereon.

However, it was shown by results of the GMNL-32 or GMCL-32_HK treatment group in FIGS. 1A and 1B that after the tomato leaf was treated with the plant growth regulator and then sprayed with *Colletotrichum gloeosporioides* for 5 days, the leaf was not etiolated (as shown in FIG. 1A) and the lesion number (FIGS. 1A and 1B) was significantly reduced, indicating that the *Lactobacillus paracasei* GMNL-32 fermenting culture solution could elevate the effect of the tomato against the infection of *Colletotrichum gloeosporioidesn.*

Next, after the *Lactobacillus paracasei* GMNL-32 fermenting culture solution was treated by thermal sterilization (i.e., GMCL-32_HK), it still reserves protection effect (as shown in FIG. 1B) and had no statistically significant difference with the *Lactobacillus paracasei* GMNL-32 fermenting culture solution (the same letter represented there was no statistical difference (p>0.05) between groups), representing that the protection effect of the *Lactobacillus paracasei* GMNL-32 fermenting culture solution was not influenced by heat.

Figure 2A:
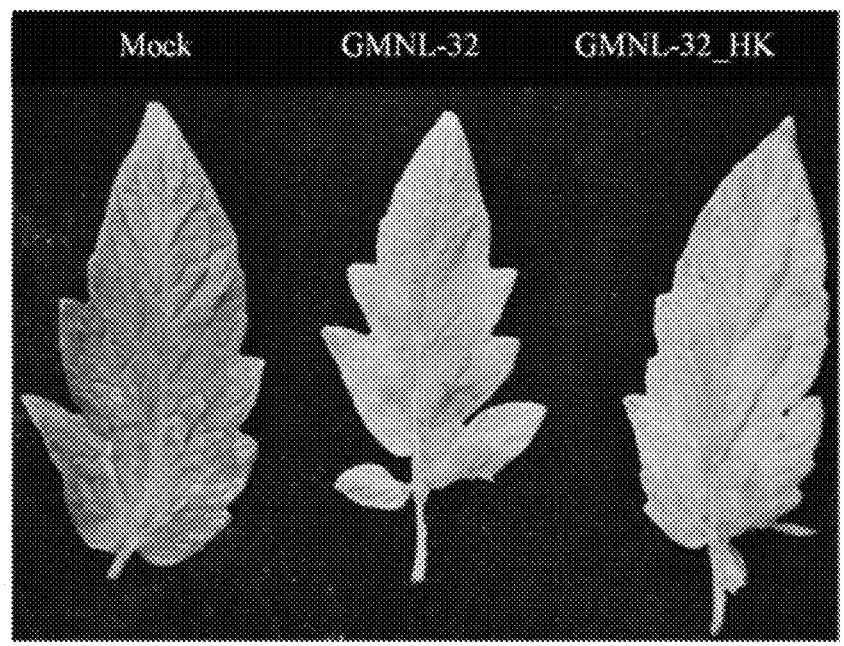
FIGS. 2A to 2D show leaf appearances (FIG. 2A, FIG. 2C) and bar diagrams of lesion numbers per leaf (FIG. 2B, FIG. 2D) of a tomato plant treated with a plant growth regulator and then inoculated with *Pseudomonas syringae* pv. Tomato in accordance with one embodiment of the present invention.
Figure 2B:
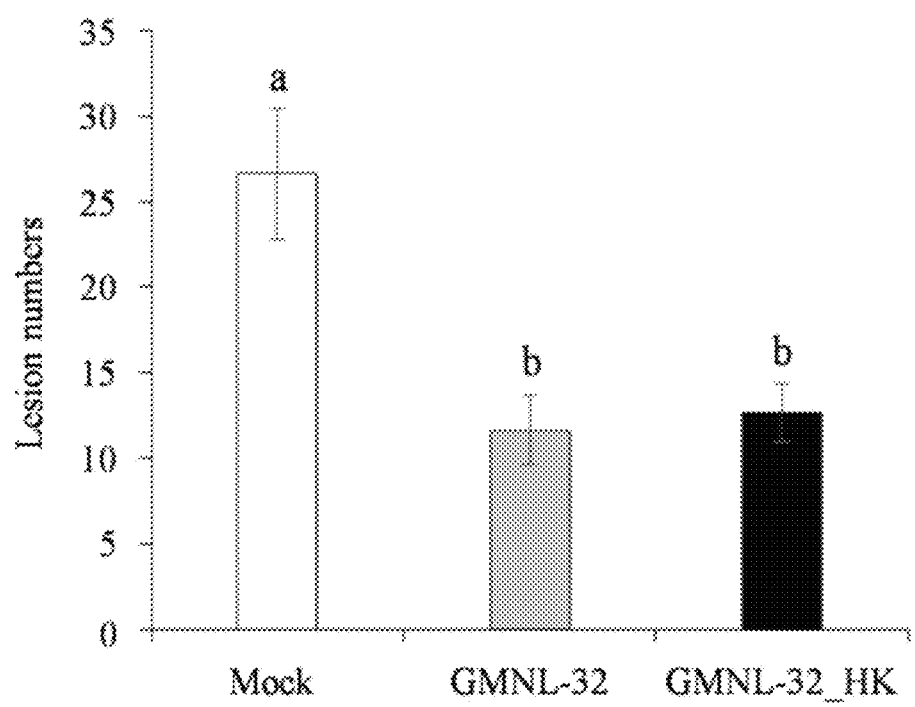
Figure 2C:
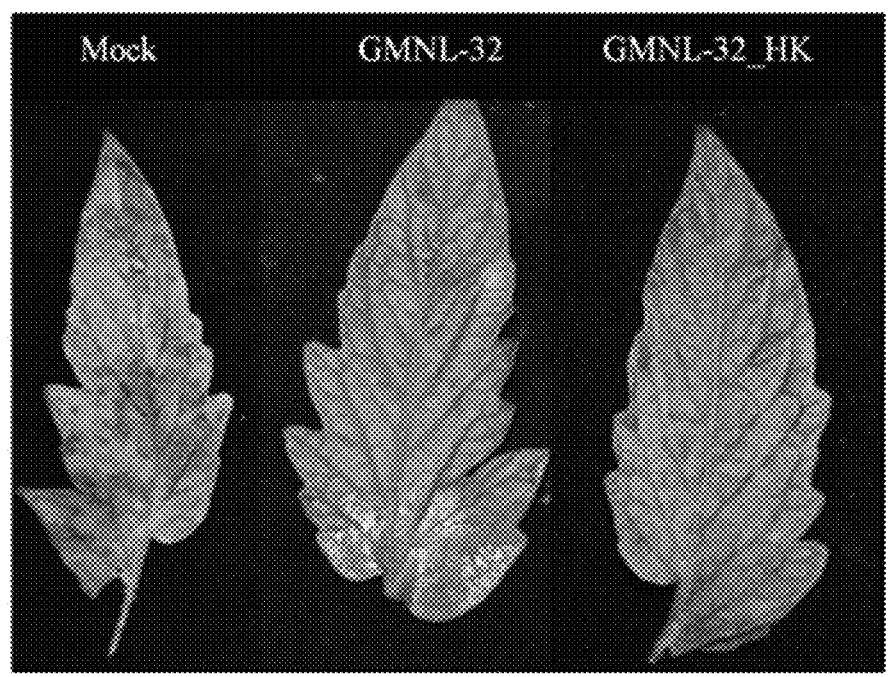
Figure 2D:
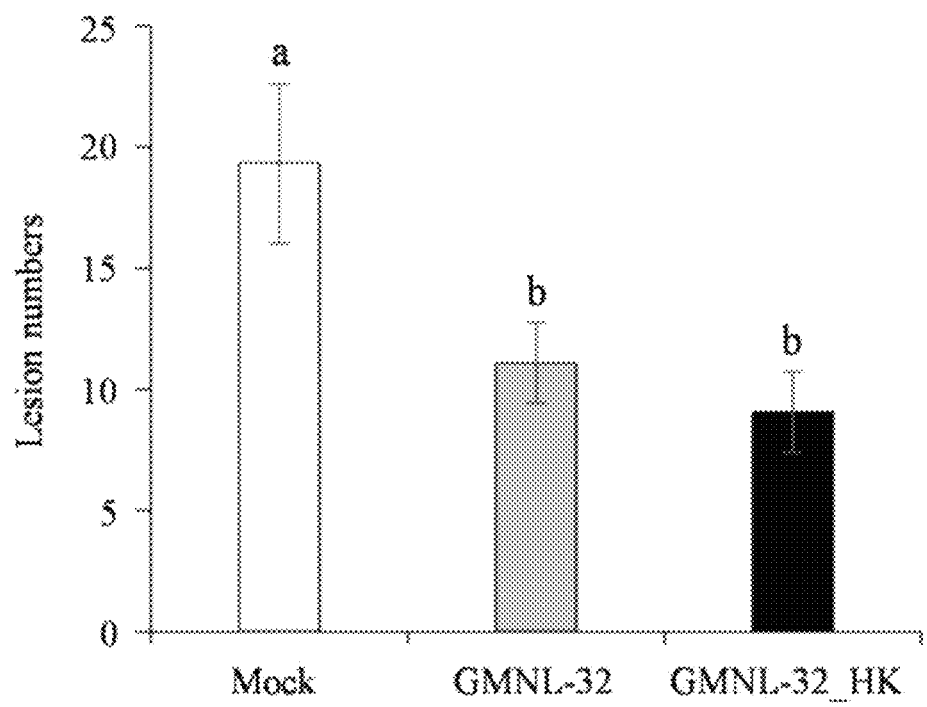

1.3 Assessment of Effect of Plant Growth Regulator of Elevating Anti-*Pseudomonas* Ability of Tomato Plant Referring to FIGS. 2A to 2D, these figures show leaf appearances (FIGS. 2A, 2C) and bar diagrams of lesion numbers per leaf (FIGS. 2B, 2D) of tomato plant treated with plant growth regulator and then inoculated with *Pseudomonas syringae* pv. Tomato in accordance with one embodiment of the present invention. In FIGS. 2A to 2D, mock represented leaf appearance of a plant without treatment of plant growth regulator but inoculated with *Pseudomonas syringae* pv. Tomato (FIGS. 2A to 2B) or non-virulent strain of *Pseudomonas syringae* pv. Tomato (FIGS. 2C to 2D).

It was shown by the mock group results in FIGS. 2A to 2D that 4 days since a tomato leaf was inoculated with *Pseudomonas syringae* pv. Tomato (Pst DC3000) or the non-virulent strain of *Pseudomonas syringae* pv. Tomato (Pst DC3000 avrRpt2), the leaf indeed would be etiolated (as shown in FIG. 2A) and had black rot lesions (FIGS. 2A to 2B) occurred thereon.

It was shown by results of the GMNL-32 treatment group in FIGS. 2A to 2B that 4 days later since the tomato leaf was treated with the plant growth regulator and then inoculated with *Pseudomonas syringae* pv. Tomato (Pst DC3000) or non-virulent strain of *Pseudomonas syringae* pv. Tomato (Pst DC3000 avrRpt2), the lesion number per leaf (FIGS. 2B and 2D) was significantly reduced, indicating that the *Lactobacillus paracasei* GMNL-32 fermenting culture solution could elevate the effect of the tomato against the infection of *Pseudomonas syringae* pv. Tomato.

Next, after the *Lactobacillus paracasei* GMNL-32 fermenting culture solution was treated by thermal reduction (i.e., GMCL-32_HK), it still reserves protection effect (as shown in FIGS. 2B and 2D) and had no statistically significant difference with the *Lactobacillus paracasei* GMNL-32 fermenting culture solution (the same letter represented there was no statistical difference (p>0.05) between groups), representing that the protection effect of the *Lactobacillus paracasei* GMNL-32 fermenting culture solution was not influenced by heat.

2. Assessment of Effect of Plant Growth Regulator of Elevating Anti-Non-Biological-Stress Ability of Tomato Plant A tomato plant (*Solanum lycopersicum* with a variety of Known-You 301 available from Known-You Seed Co., Ltd. in Taiwan, aged 4 to 5 weeks) was used in this Example, and treated (i.e., irrigated) with the RO water (mock) and the fermenting culture solution or thermally sterilized fermenting culture solution of *Lactobacillus paracasei* GMNL-32 of Example 1, respectively, for 9 days, and then put through various anti-stress treatments below.

Figure 3A:
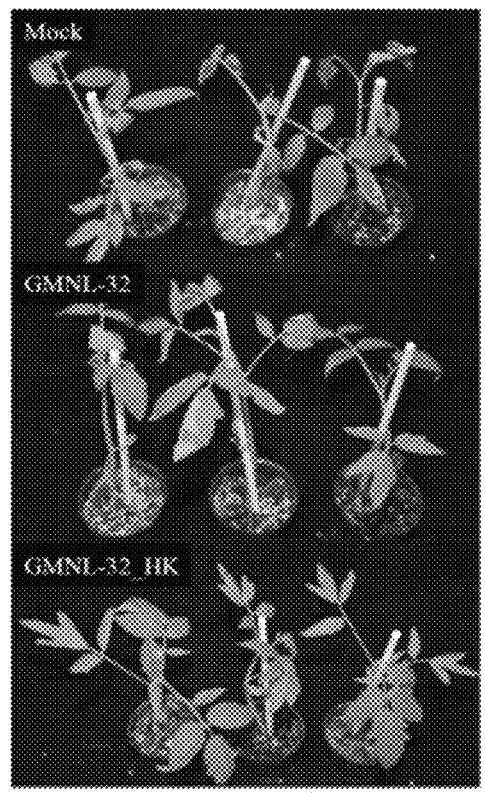
FIGS. 3A and 3B show a plant appearance (FIG. 3A) and a bar diagram of thermal damage (FIG. 3B) of a tomato plant treated with a plant growth regulator and then thermally processed in accordance with one embodiment of the present invention.
Figure 3B:
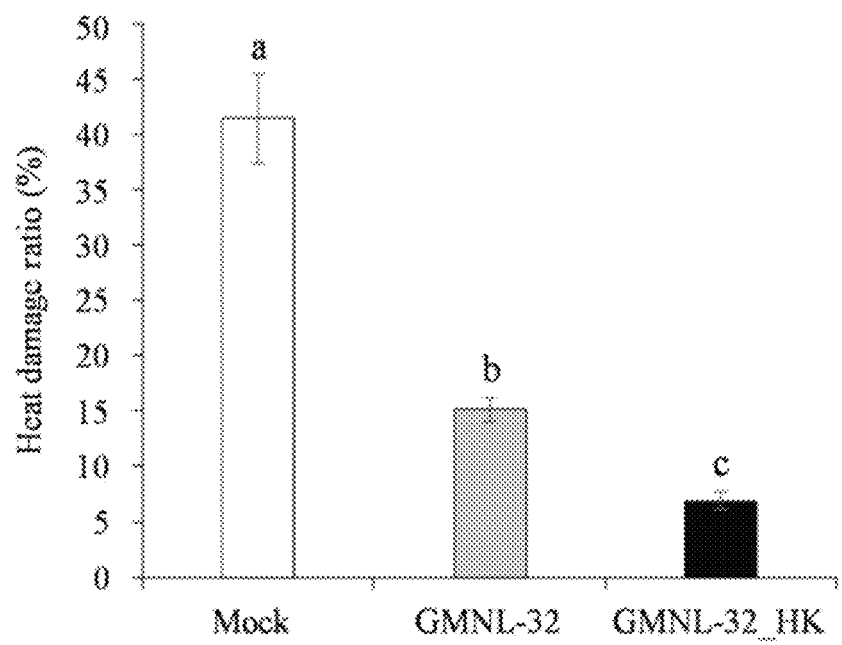

2.1 Assessment of Effect of Plant Growth Regulator of Elevating Heat Resisting Ability of Tomato Plant The aforementioned tomato plant was treated under 45° C. for 6 hours to reach a thermal damage, and then taken photos for the plant appearance, and observed during the next 24 hours for the damage extent in different levels, with the results shown in FIGS. 3A and 3B. The aforementioned damage extent was quantified in levels by equation (I):

$$\text{Elevated temperature damage (\%)} = [(\text{curly leaf number/total leaf number}) * 100\%]. \quad (I)$$

Letters a and b, c in FIG. 3B represented statistical results respectively, and different letters indicate a significant difference (p<0.05) between groups.

Referring to FIGS. 3A and 3B, these figures show a plant appearance (FIG. 3A) and a bar diagram of thermal damage (FIG. 3B) of a tomato plant treated with a plant growth regulator and then thermally processed in accordance with one embodiment of the present invention. In FIG. 3B, a vertical axis represented a thermal damage rate (%), and a horizontal axis represented each of treatment groups, in which the mock represented treatment with water, GMNL-32 represented treatment with *Lactobacillus paracasei* GMNL-32 fermenting culture solution, and GMNL-32_HK represented treatment with *Lactobacillus paracasei* GMNL-32 thermally sterilized fermenting culture solution.

It was shown by the result of the mock group in FIG. 3A that the tomato plant of the mock group was treated with water and then treated under an elevated temperature of 45° C. for 6 hours, followed by being incubated for 24 hours, until the leaf curled and died.

However, it was shown by the results of the GMNL-32 or GMCL-32_HK treatment group in FIGS. 3A and 3B that after the tomato plant was irrigated with the *Lactobacillus paracasei* GMNL-32 fermenting culture solution or *Lactobacillus paracasei* GMNL-32 thermally sterilized fermenting culture solution, the leaf did not curled badly (as shown in FIG. 3A). In addition, it was shown by the result by grading and quantifying the thermal-damage rate in FIG. 3B that, compared with the thermal damage extent of the mock group, the treatment by the fermenting culture solution or thermally sterilized fermenting culture solution of *Lactobacillus paracasei* GMNL-32 could significantly mitigate the thermal damage of the tomato plant, indicating that the *Lactobacillus paracasei* GMNL-32 fermenting culture solution could improve the heat-resistant ability of the tomato plant.

Next, after the *Lactobacillus paracasei* GMNL-32 fermenting culture solution was treated by thermally sterilized (i.e., GMCL-32_HK), it still had protection effect (as shown in FIG. 3B), representing that the protection effect of the *Lactobacillus paracasei* GMNL-32 fermenting culture solution was not influenced by thermal sterilization treatment.

Figure 4A:
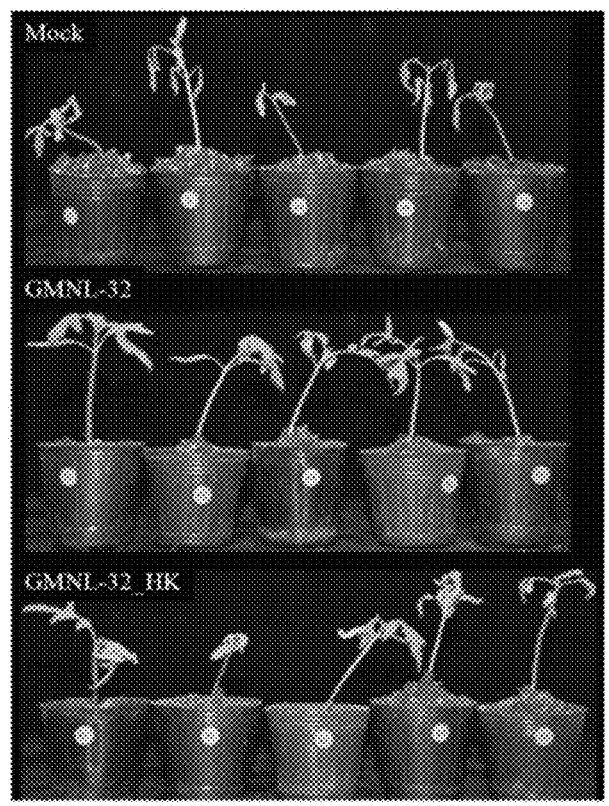
FIGS. 4A and 4B show a plant appearance (FIG. 4A) and a bar diagram of thermal damage (FIG. 4B) of a tomato plant treated with a plant growth regulator and then exposed to UV in accordance with one embodiment of the present invention.
Figure 4B:
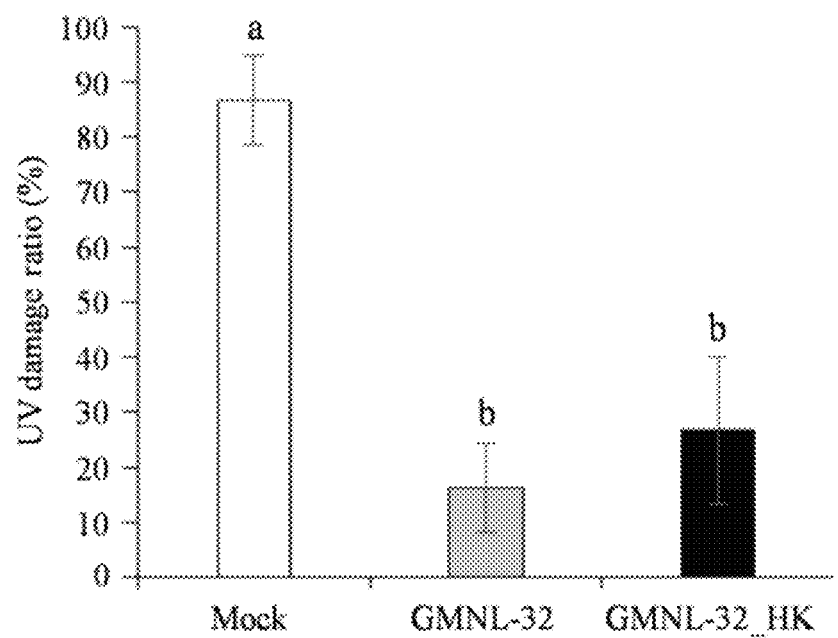

2.2 Assessment of Effect of Plant Growth Regulator of Mitigating UV Exposure Damage to Tomato Plant After radiating the aforementioned tomato plant with UV-C (at a wave length of 253.7 nm) for 30 minutes to reach a UV exposure damage, the photos of plant appearance was taken for the next 24 hours, and the damage extent was graded by equation (II) in levels, with the results shown in FIGS. 4A and 4B:

$$\text{Damage rate (\%)} = (N0^*n + N1^*n + N2^*n + N3^*n)/(Nt^*nt)^*100. \quad \text{(II)}$$

In the equation (II), N represented a number of levels, n represented a number of samples, Nt represented a total number of levels, and nt represented a total number of samples. Letters a and b, c in FIG. 3B represented statistical results respectively, and different letters indicated a significant difference ($p<0.05$) between groups while the same letter represented that there was no statistically significant result ($p>0.05$) between groups.

Referring to FIGS. 4A and 4B, these figures show a plant appearance (FIG. 4A) and a bar diagram of thermal damage (FIG. 4B) of a tomato plant treated with a plant growth regulator and then exposed to UV in accordance with one embodiment of the present invention. In FIG. 4B, a vertical axis represented a UV exposure damage rate (%), and a horizontal axis represented each of treatment groups, in which the mock represented treatment with water, GMNL-32 represented treatment with *Lactobacillus paracasei* GMNL-32 fermenting culture solution, and GMNL-32_HK represented treatment with *Lactobacillus paracasei* GMNL-32 thermally sterilized fermenting culture solution.

It was shown by the result of the mock group in FIG. 4A that the tomato plant of the mock group was treated with water and then exposed to UV radiation (at a wave length of 253.7 nm) for 30 minutes, followed by being incubated for 24 hours, until the leaf curled and died.

However, as shown in the results of the GMNL-32 or GMCL-32_HK treatment group in FIGS. 4A and 4B, after the tomato plant was irrigated with the fermenting culture solution or thermally sterilized fermenting culture solution of *Lactobacillus paracasei* GMNL-32, the leaf curling was significantly mitigated (as shown in FIG. 4A). In addition, it was shown by the result by grading and quantifying the thermal-damage rate in FIG. 4B that, compared with the UV exposure damage extent of the mock group, the treatment by the *Lactobacillus paracasei* GMNL-32 fermenting culture solution or *Lactobacillus paracasei* GMNL-32 thermally sterilized fermenting culture solution could significantly mitigate the UV exposure damage extent of the tomato plant, indicating that the *Lactobacillus paracasei* GMNL-32 fermenting culture solution could improve the anti-UV ability of the tomato plant.

Next, after the *Lactobacillus paracasei* GMNL-32 fermenting culture solution was treated by thermally sterilized (i.e., GMCL-32_HK), such fermenting culture solution still had protection effect (as shown in FIG. 4B) and had no statistically significant difference with the *Lactobacillus paracasei* GMNL-32 fermenting culture solution (the same letter represented there was no statistical difference ($p>0.05$) between groups), representing that the protection effect of the *Lactobacillus paracasei* GMNL-32 fermenting culture solution was not influenced by thermal sterilization treatment.

Figure 5A:
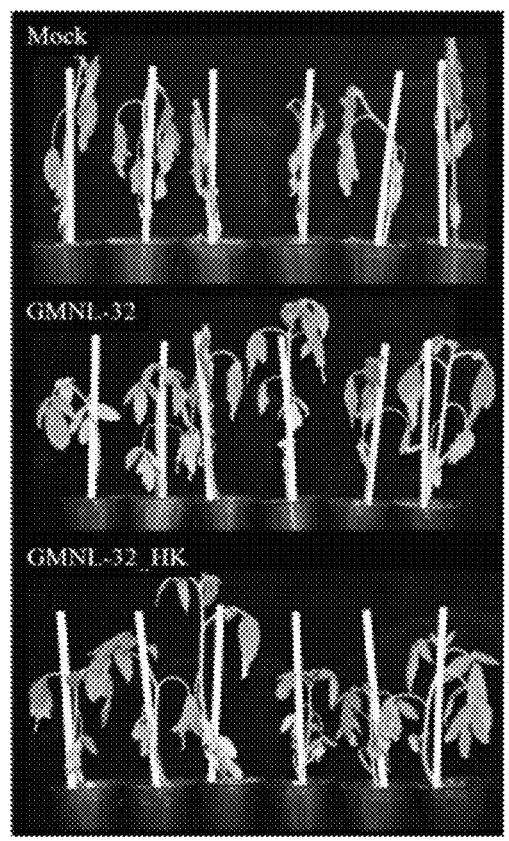
FIGS. 5A and 5B show a plant appearance (FIG. 5A) and a bar diagram of drought damage (FIG. 5B) of a tomato plant treated with a plant growth regulator and then subjected to the drought treatment in accordance with one embodiment of the present invention.
Figure 5B:
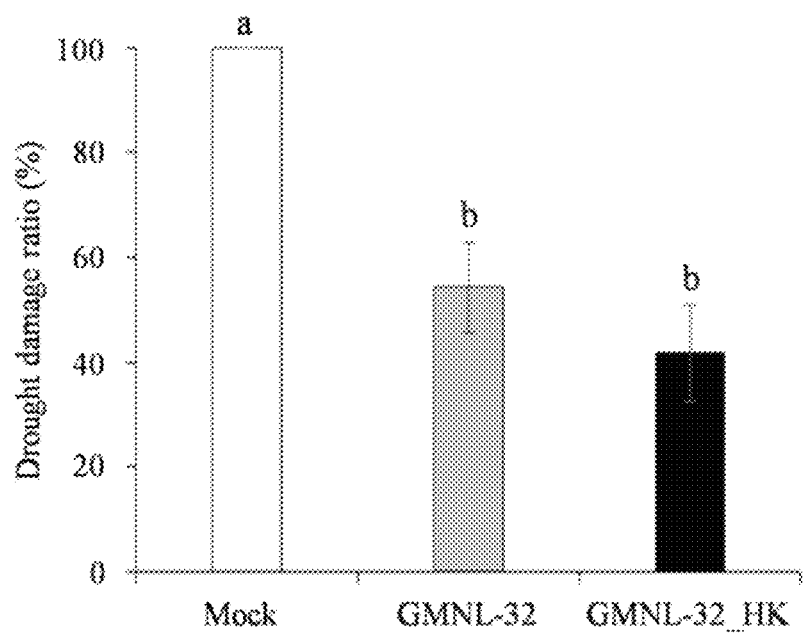

2.3 Assessment of Effect of Plant Growth Regulator of Mitigating Drought Damage to Tomato Plant The drought damage method was to treat the aforementioned tomato plant with the *Lactobacillus paracasei* GMNL-32 fermenting culture solution or *Lactobacillus paracasei* GMNL-32 thermally sterilized fermenting culture solution and stop watering, take photos of the plant appearance on the 14th day and classify the damage extent in different levels by equation (II), with the result shown in FIGS. 5A and 5B.

Letters a and b, c in FIG. 5B represented statistical results respectively, and different letters indicate a significant difference ($p<0.05$) between groups while the same letter represented that there was no statistically significant result ($p>0.05$) between groups.

Referring to FIGS. 5A and 5B, these figures show a plant appearance (FIG. 5A) and a bar diagram of drought damage (FIG. 5B) of a tomato plant treated with a plant growth regulator and then subject to drought treatment in accordance with one embodiment of the present invention. In FIG. 5B, a vertical axis represented a drought damage rate (%), and a horizontal axis represented each of treatment groups, in which the mock represented treatment with water, GMNL-32 represented treatment with *Lactobacillus paracasei* GMNL-32 fermenting culture solution, and GMNL-32_HK represented treatment with *Lactobacillus paracasei* GMNL-32 thermally sterilized fermenting culture solution.

It was shown by the result of the mock group in FIG. 5A that the tomato plant of the mock group was treated with water, followed by stopping water irrigation for 14 days, until the leaf curled, dried, and died.

However, it was shown by the results of the GMNL-32 or GMCL-32_HK treatment group in FIGS. 5A and 5B that after the tomato plant was irrigated with the *Lactobacillus paracasei* GMNL-32 fermenting culture solution or *Lactobacillus paracasei* GMNL-32 thermally sterilized fermenting culture solution, the leaf dehydration was significantly mitigated (as shown in FIG. 5A). In addition, it was shown by the result by grading and quantifying the drought-damage rate in FIG. 5B that, compared with the drought damage of the mock group, the treatment by the *Lactobacillus paracasei* GMNL-32 fermenting culture solution or *Lactobacillus paracasei* GMNL-32 thermally sterilized fermenting culture solution could significantly elevate the drought-resistant ability of the tomato plant.

Next, after the *Lactobacillus paracasei* GMNL-32 fermenting culture solution was sterilized thermally (i.e., GMCL-32_HK), such fermenting culture solution still had protection effect (as shown in FIG. 5B) and had no statistically significant difference with the *Lactobacillus paracasei* GMNL-32 fermenting culture solution [the same letter represented there was no statistical difference (p>0.05) between groups], representing that the protection effect of the *Lactobacillus paracasei* GMNL-32 fermenting culture solution was not influenced by thermal sterilization treatment.

3. Assessment of Effect of Plant Growth Regulator of Elevating Ability of Rhizobacteria Wrapping around Tomato Plant Currently known plant growth-promoting rhizobacteria (PGPR) included *Bacillus thuringiensis* and *B. amyloliquefaciens*. This Example assessed the use of the plant growth regulator to adjust the ability of rhizobacteria wrapping around the root and thus improved the anti-stress ability of the plant.

First of all, the *Bacillus thuringiensis* and *B. amyloliquefaciens* were inoculated in the nutrient broth (NB) liquid culture medium under 28° C. for 14 hours and 16 hours of incubation, respectively. Next, after the resultant bacteria solution concentration was adjusted to $OD_{600\ nm}$ 0.8, and each one of two bacteria was poured into 2 kg of soil (soil bacteria number=$10^8$ CFU/g) respectively, followed by adding 150 mL of the fermenting culture solution or thermally sterilized fermenting culture solution of *Lactobacillus paracasei* GMNL-32. And then, the tomato root tissues were sampled on the 1st, 5th, 9th, 13th, 17th, and 30th day, weighed, vibrated in 20 mL of 0.1% WA containing 0.025% SILWET L-77 for 5 minutes, serially diluted, and spread on the LB (Luria-Bertani) culture plate with glass beads, followed by being incubated under 28° C. for 1 day and calculated for colony numbers, so as to assess the ability of rhizobacteria wrapping around the plant root, and the results were shown in FIGS. 6A and 6B, respectively. Letters a and b, c in FIGS. 6A and 6B represented statistical results respectively, and different letters indicated a significant difference (p<0.05) between groups while the same letter represented that there was no statistically significant result (p>0.05) between groups.

Figure 6A:
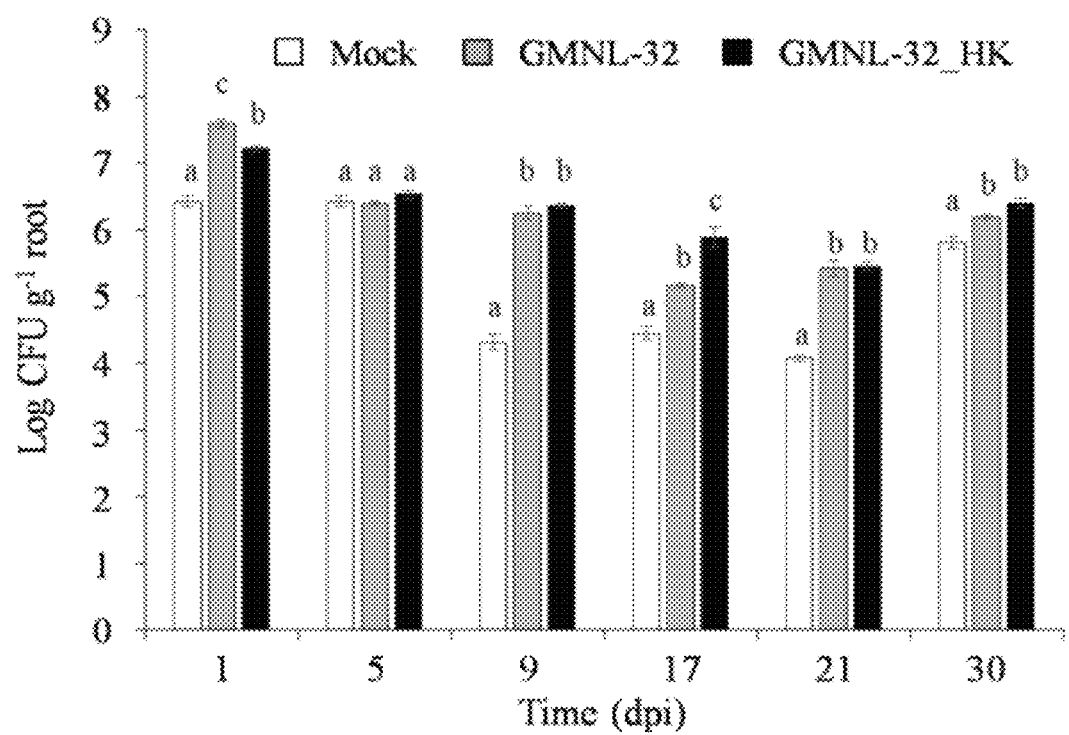
FIGS. 6A and 6B show bar diagrams of root bacteria count of a tomato plant inoculated with bacteria solutions of *Bacillus thuringiensis* (FIG. 6A) or *B. amyloliquefaciens* (FIG. 6B) and then treated with the plant growth regulator in accordance with one embodiment of the present invention.
Figure 6B:
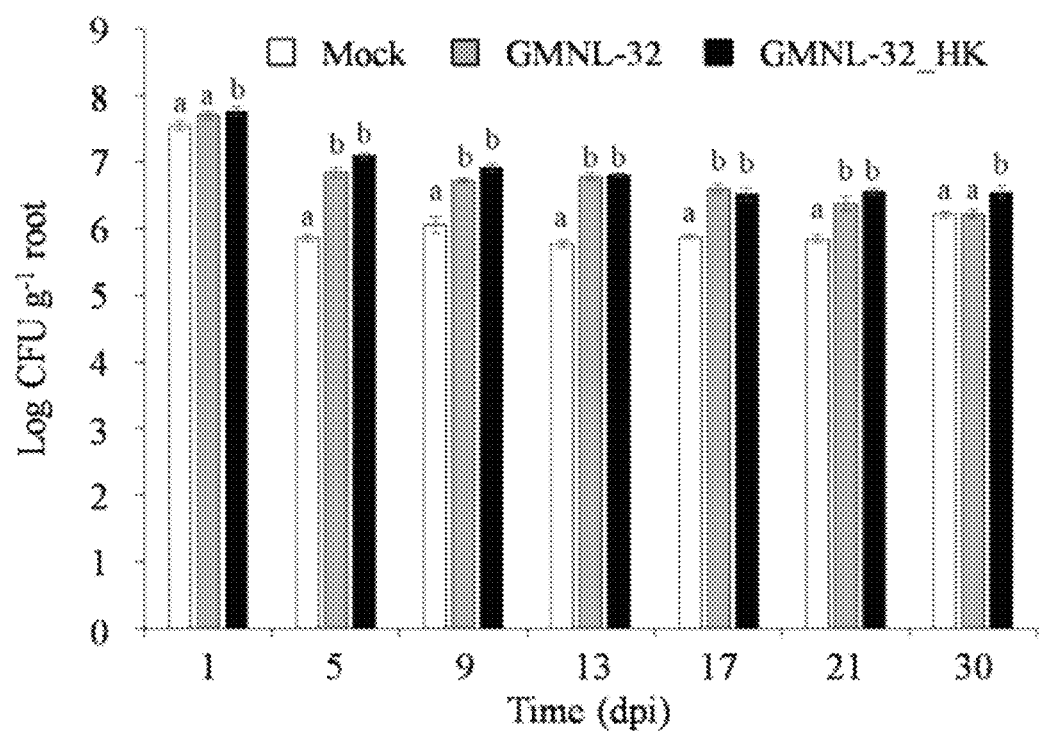

Referring to FIGS. 6A and 6B, these figures showed bar diagrams of root bacteria number of a tomato plant that was inoculated with bacteria solutions of *Bacillus thuringiensis* (FIG. 6A) or *B. amyloliquefaciens* (FIG. 6B) and then treated with the plant growth regulator in accordance with one embodiment of the present invention. In FIGS. 6A and 6B, the mock group represented the root bacteria number by administrating water of the same volume as the treatment group (but without plant growth regulator) when inoculating the bacteria solution of *Bacillus thuringiensis* or *B. amyloliquefaciens*.

It was shown by the result of the mock group in FIG. 6A that after the tomato root was inoculated with the bacteria solution of *Bacillus thuringiensis*, it could be observed after 9 days that the bacteria number reduced about 100 times. However, if the fermenting culture solution or thermally sterilized fermenting culture solution of *Lactobacillus paracasei* GMNL-32 was added in when inoculating the bacteria solution, the decrease of bacteria number of *Bacillus thuringiensis* could be mitigated, and the *Bacillus thuringiensis* could maintain its bacteria number for 30 days.

It was shown by the result of the mock group in FIG. 6B that after the tomato root was inoculated with the bacteria solution of *B. amyloliquefaciens*, it could also be observed after 5 days that the bacteria number reduced about 100 times. However, if the fermenting culture solution or thermally sterilized fermenting culture solution of *Lactobacillus paracasei* GMNL-32 was added therein when inoculating the bacteria solution, the decrease of bacteria number of *B. amyloliquefaciens* could be mitigated, and *B. amyloliquefaciens* could maintain its bacteria number for 21 days, indicating that the fermenting culture solution or thermally sterilized fermenting culture solution of *Lactobacillus paracasei* GMNL-32 both were effective in keeping the rhizobacteria wrapping around the tomato plant.

Moreover, after the *Lactobacillus paracasei* GMNL-32 fermenting culture solution was treated by thermally sterilized (i.e., GMCL-32_HK), such fermenting culture solution still had protection effect (as shown in FIG. 6B), representing that the protection effect of the *Lactobacillus paracasei* GMNL-32 fermenting culture solution was not influenced by thermal sterilization treatment.

4. Assessment of Effect of Plant Growth Regulator of Elevating Hydrogen Peroxide Content of Tomato Plant After 5 days growth of the transplanted tomato plant, the root was irrigated with 25 mL of the fermenting culture solution or thermally sterilized fermenting culture solution of *Lactobacillus paracasei* GMNL-32. After treatment for 0, 12, 24, 36, and 48 hours, 0.05 g of the second leaf from the top of the plant was taken for grinding with liquid nitrogen, and vibrated for 10 seconds after adding 600 μL of phosphate buffer solution (50 mM, pH 6.8). Next, after 25 minutes of centrifugation at 9,000×g, 400 μL of a upper layer of the solution was added with 200 μL of titanium sulfate solution, vibrated for 10 seconds, and then centrifuged at 6,000×g for 15 minutes. Then, a absorbance of 200 μL of a upper layer of the solution was measured with 410 nm of light, and calculated for the hydrogen peroxide content by equation (III), with the result shown in FIG. 7:

$$\text{Hydrogen peroxide content} = \{[(OD_{410\ nm} - 0.0011) / 0.0004] * 1.5\} / \text{weight (mg)}. \quad \text{(III)}$$

Figure 7:
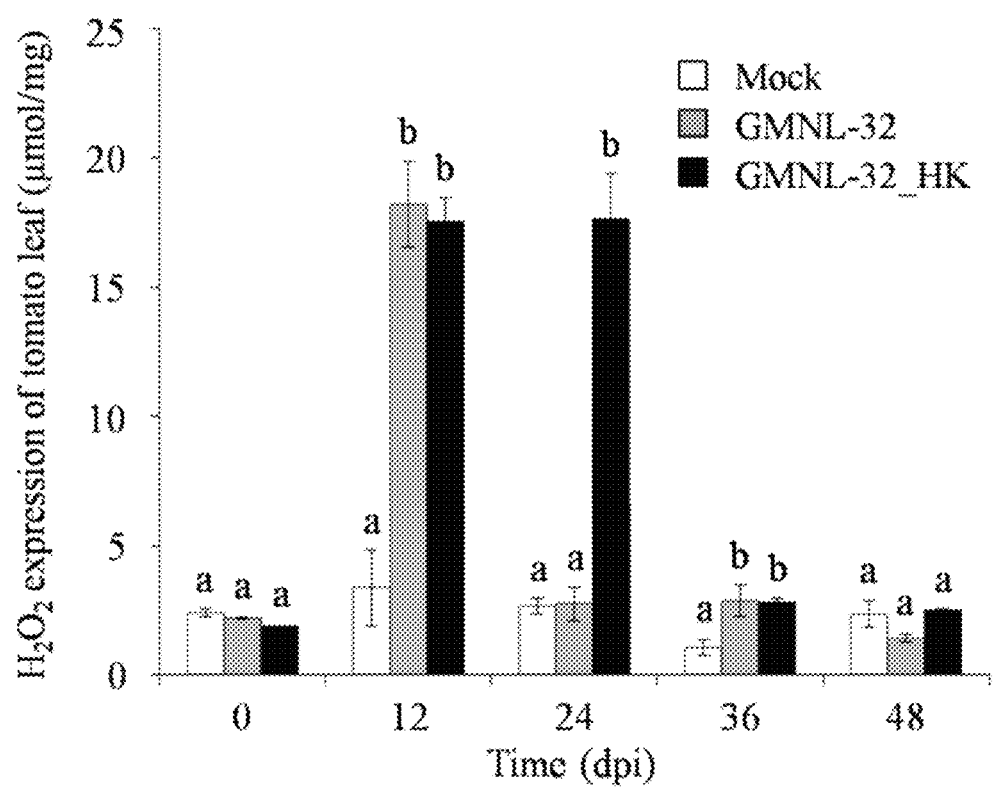
FIG. 7 shows a bar diagram of hydrogen peroxide content of tomato leaves treated with the plant growth regulator in accordance with one embodiment of the present invention.

Letters a and b in FIG. 7 represented statistical results respectively, and different letters indicated a significant difference (p<0.05) between groups while the same letter represented that there was no statistically significant result (p>0.05) between groups.

Referring to FIG. 7, it showed a bar diagram of hydrogen peroxide content of tomato leaves treated with the plant growth regulator in accordance with one embodiment of the present invention. In FIG. 7, the mock group represented the hydrogen peroxide content of tomato leaves when only administrating water of the same volume as the treatment group (but without plant growth regulator).

It was shown by the result of the mock group in FIG. 7 that after the tomato root was treated by water, there was no significant change of the hydrogen peroxide content of tomato leaves. However, after treating the tomato plant by using *Lactobacillus paracasei* GMNL-32 fermenting culture solution for 12 hours, there was effectively increased hydrogen peroxide content of tomato leaves. In addition, the treatment for 12 hours and 24 hours by *Lactobacillus paracasei* GMNL-32 thermally sterilized fermenting culture solution could both effectively increase the leaf hydrogen peroxide content, indicating the *Lactobacillus paracasei* GMNL-32 fermenting culture solution or *Lactobacillus paracasei* GMNL-32 thermally sterilized fermenting culture solution were both effective in elevating the tomato's hydrogen peroxide content.

5. Assessment of Effect of Plant Growth Regulator of Elevating Peroxidase Activity of Tomato Plant After 5 days growth of the transplanted tomato plant, the root was irrigated with 25 mL of *Lactobacillus paracasei* GMNL-32 fermenting culture solution or *Lactobacillus paracasei* GMNL-32 thermally sterilized fermenting culture solution. After treatment for 12, 24, 36, and 48 hours, 0.05 g of the second leaf on top of the plant was grinded with liquid nitrogen, and vibrated for 10 seconds after adding 1,000 μL of phosphate buffer solution (50 mM, pH 5.8). Next, after 20 minutes of centrifugation at 12,000×g, 10 μL of a upper layer of the solution was added with 200 μL of phosphate buffer solution, 100 μL of methxoyphenol phosphate, and 90 mL of 39 mM hydrogen peroxide into the solution, measured for the light absorbing value at 470 nm, and calculated for the peroxidase activity by equation (IV), with the result shown in FIG. 8:

Peroxidase activity ($\Delta$Abs 470 nm/min/$gFW$)=
($\Delta OD_{470\ nm}$)/26.6*reaction volume (mL)*dilution ratio/reaction time/weight (g). (IV)

Figure 8:
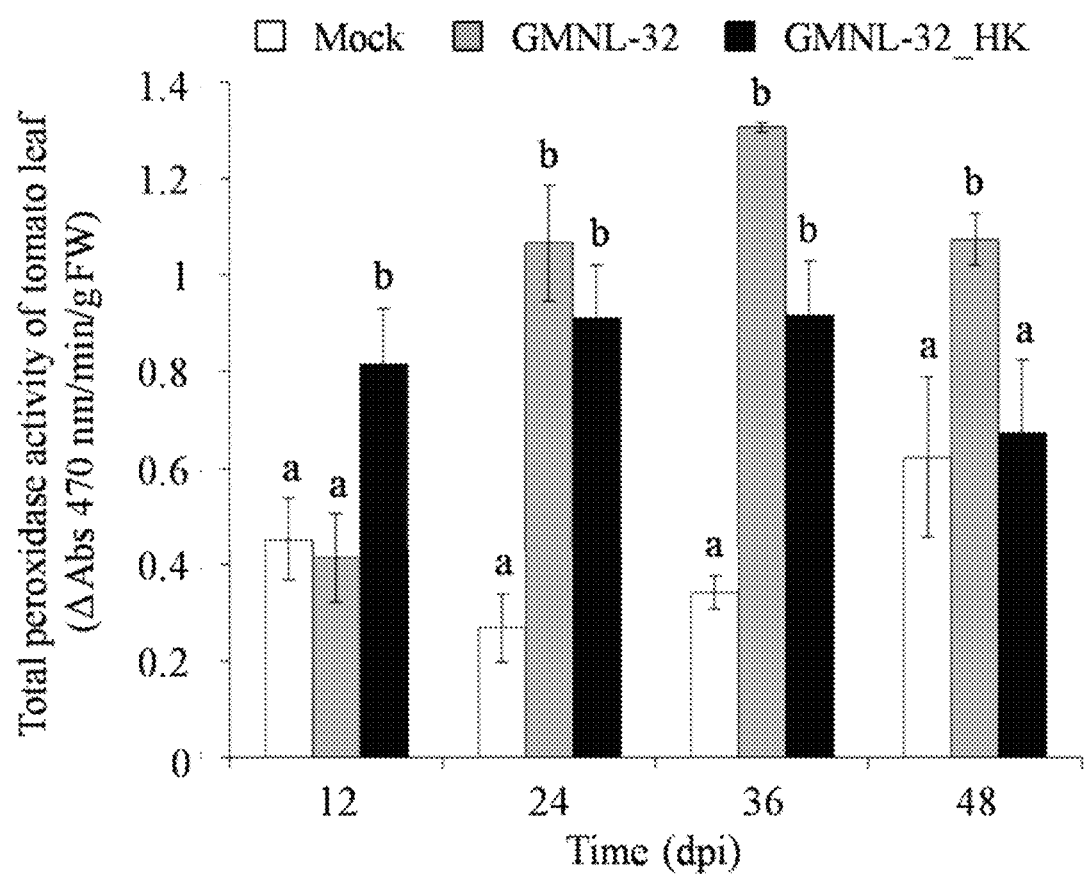
FIG. 8 shows a bar diagram of peroxidase activity content of tomato leaves treated with the plant growth regulator in accordance with one embodiment of the present invention.

Letters a and b in FIG. 8 represented statistical results respectively, and different letters indicated a significant difference (p<0.05) between groups while the same letter represented that there was no statistically significant result (p>0.05) between groups.

Referring to FIG. 8, it showed a bar diagram of peroxidase activity content of tomato leaves treated with the plant growth regulator in accordance with one embodiment of the present invention. In FIG. 8, the mock group represented the leaf peroxidase activity when only administrating water of the same volume as the treatment group (but without plant growth regulator).

It was shown by the result of the mock group in FIG. 8 that after the tomato root was treated by using water the leaf peroxidase activity sees no significant change. However, in comparison to the mock group, after treating the tomato plant by using *Lactobacillus paracasei* GMNL-32 fermenting culture solution for 24 hours, the plant leaf peroxidase activity was effectively improved by 5 times and could stay for 48 hours. In addition, the leaf peroxidase activity could also be effectively improved by the treatment for 12 hours by using *Lactobacillus paracasei* GMNL-32 thermally sterilized fermenting culture solution and stay for 36 hours, indicating that the *Lactobacillus paracasei* GMNL-32 fermenting culture solution or *Lactobacillus paracasei* GMNL-32 thermally sterilized fermenting culture solution were both effective in elevating the tomato's hydrogen peroxide content.

6. Assessment of Effect of Plant Growth Regulator of Elevating Anti-Disease Gene Expression of Tomato Plant Currently, it was known that regulatory genes (such as LeOPR3, LeCOI1, and LeJAZ1) in signaling pathways related to jasmonic acid (JA), regulatory gene (such as LePR1) in signaling pathways related to salicylic acid (SA) correlates with the plant disease resistance. By detecting mRNA expression levels of the aforementioned genes, it could assess the effect of the plant growth regulator elevating the tomato's disease resistance.

After the tomato plant was cultured for 20 days, the root was irrigated with 25 mL of *Lactobacillus paracasei* GMNL-32 fermenting culture solution or *Lactobacillus paracasei* GMNL-32 thermally sterilized fermenting culture solution. After the treatment for 1 day and 3 days, the second leaf on top of the plant was take for extracting a total plant tissue RNA by using a commercial extraction total RNA kit (such as tissue total RNA mini kit). Next, after 1 μL of RNA was reversely transcribed into cDNA by using a commercial reverse transcription kit (such as MMLV Reverse Transcription kit), 1 μL of 10 mM primer pair, 2 μL of 10×PCR buffer solution, 1 μL of 2.5 mM dNTP, 0.1 μL of 5 units/μL Pro Taq DNA polymerase, 10 μL of 2× super SYBR Green PCR Master Mix were added in, and then sterile water was added in to make up the total volume of the reactant to 20 μL for implementing the quantitative real time PCR reaction, with its results shown in FIGS. 9A to 10B.

The aforementioned primer pair includes upstream primers and downstream primers of LeOPR3, LeCOI1, LeJAZ1, and LePR1 in a sequence as shown by the SEQ ID NO:4 to 13. The ratio of the PCR reaction cycle of LeOPR3, LeCOI1, LeJAZ1, and LePR1 to the PCR reaction cycle of ef1α acts as the data of relative value. The aforementioned resultant data was implemented by the same statistic method as in the aforementioned Examples rather than repeatedly reciting it. Letters a and b in FIGS. 9A to 10B represented statistical results respectively, and different letters indicate a significant difference (p<0.05) between groups while the same letter represented no statistically significant result (p>0.05) between groups.

6.1 Assessment of Effect of Plant Growth Regulator of Elevating Signaling pathways Related to Jasmonic Acid of Tomato Plant Referring to FIGS. 9A to 9F, these figures show bar diagrams of gene mRNA relative contents of LeOPR3, LeCOI1, and LeJAZ1 of a tomato plant treated with the plant growth regulator in accordance with one embodiment of the present invention.

Figure 9A:
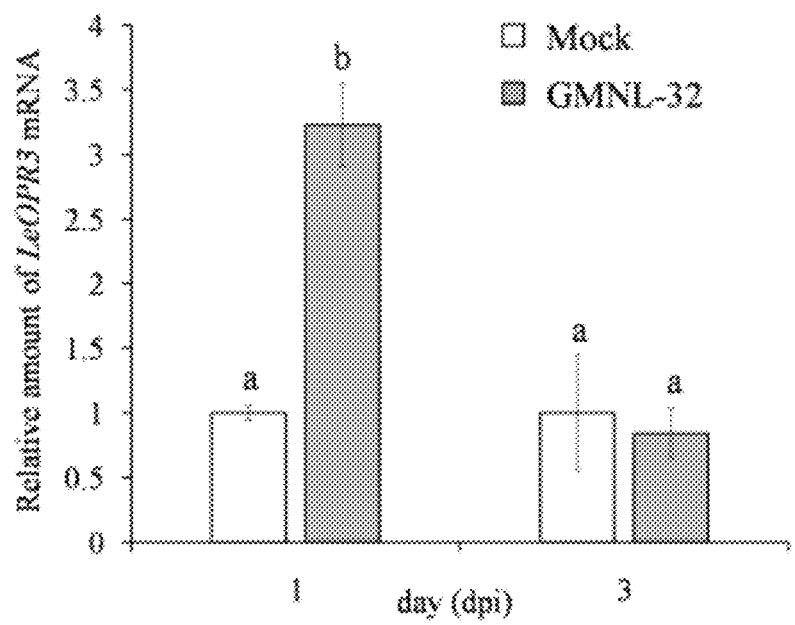
FIGS. 9A to 9F show bar diagrams of mRNA relative contents of genes LeOPR3, LeCOI1, and LeJAZ1 of a tomato plant treated with the plant growth regulator in accordance with one embodiment of the present invention.
Figure 9B:
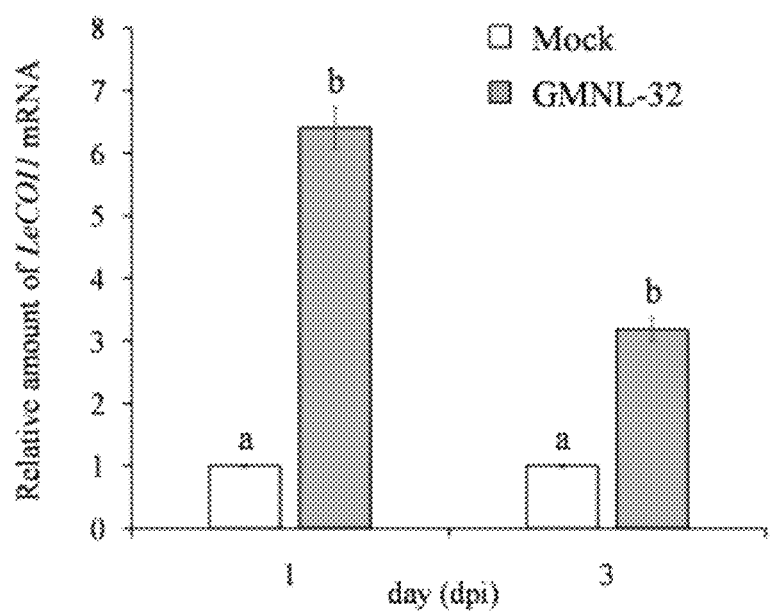
Figure 9C:
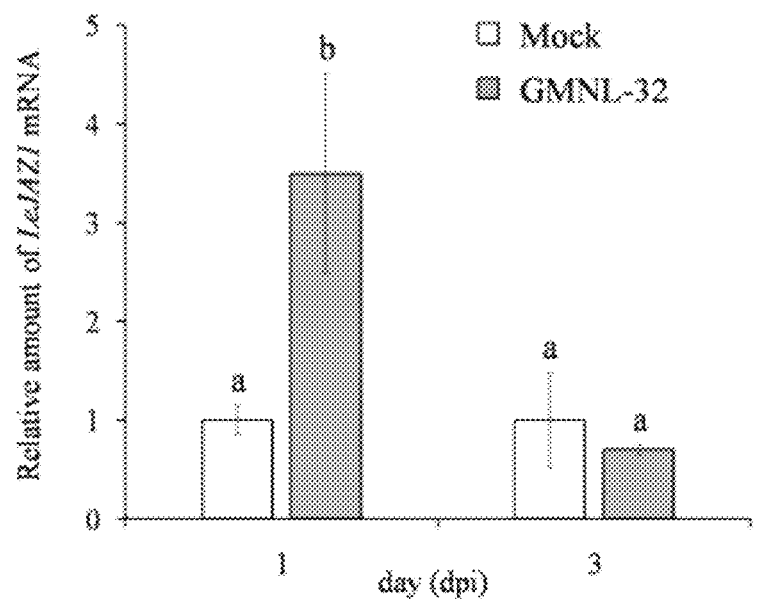
Figure 9D:
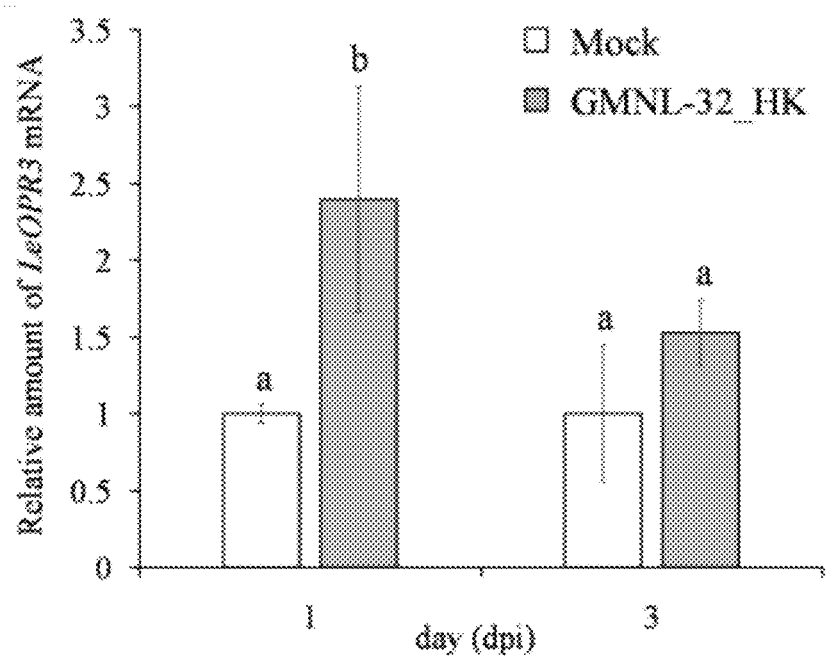
Figure 9E:
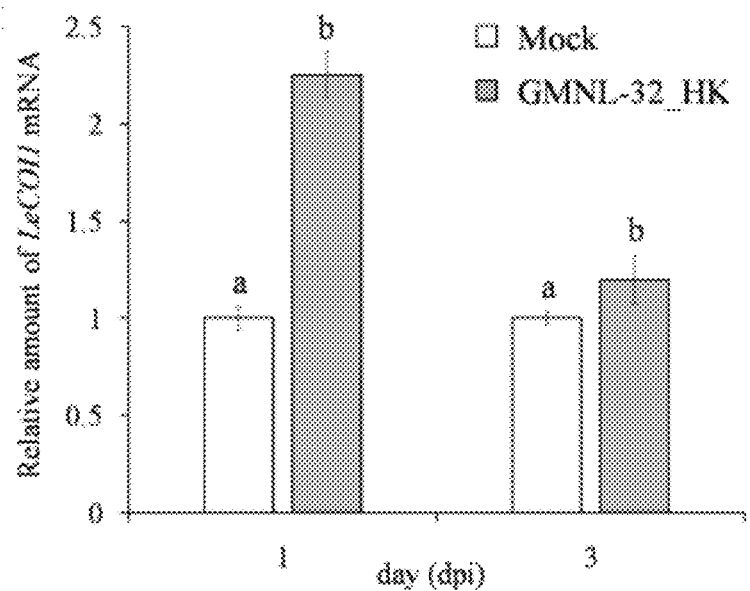
Figure 9F:
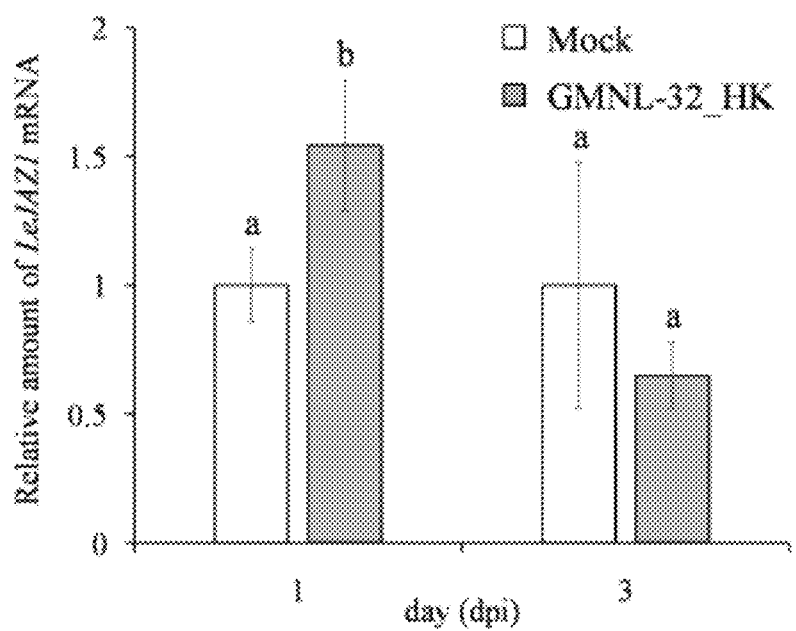

It was shown by results in FIGS. 9A to 9F that, when setting the mRNA expression level of LeOPR3, LeCOI1, and LeJAZ1 in the mock group as 1.0, the tomato plant that was treated with the *Lactobacillus paracasei* GMNL-32 fermenting culture solution (as shown in FIGS. 9A to 9C) or *Lactobacillus paracasei* GMNL-32 thermally sterilized fermenting culture solution (as shown in FIGS. 9D to 9F) for 1 day sees the expression of JA regulatory gene LeOPR3, LeCOI1, and LeJAZ1 in its leaf all higher than that of the mock group. However, after the treatment of 3 days, the LeCOI1 expression level inside the tomato plant that was treated with the *Lactobacillus paracasei* GMNL-32 fermenting culture solution (as shown in FIGS. 9A to 9C) or *Lactobacillus paracasei* GMNL-32 thermally sterilized fermenting culture solution (as shown in FIGS. 9D to 9F) still had a significant difference from that of the mock group, indicating that the plant treatment by *Lactobacillus paracasei* GMNL-32 fermenting culture solution could indeed activate anti-disease paths related to jasmonic acid (JA) inside the plant.

Figure 10A:
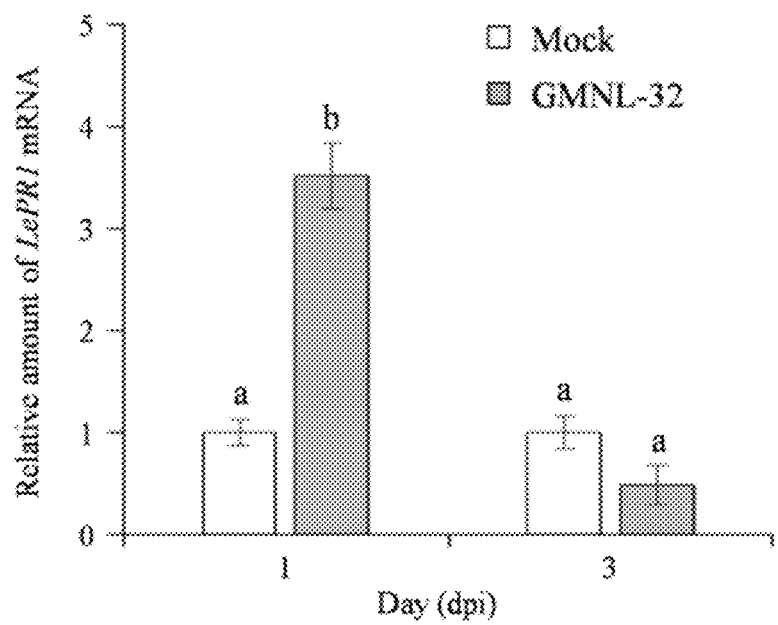
FIGS. 10A and 10B show bar diagrams of mRNA relative contents of gene LePR1 of a tomato plant treated with the plant growth regulator in accordance with one embodiment of the present invention.
Figure 10B:
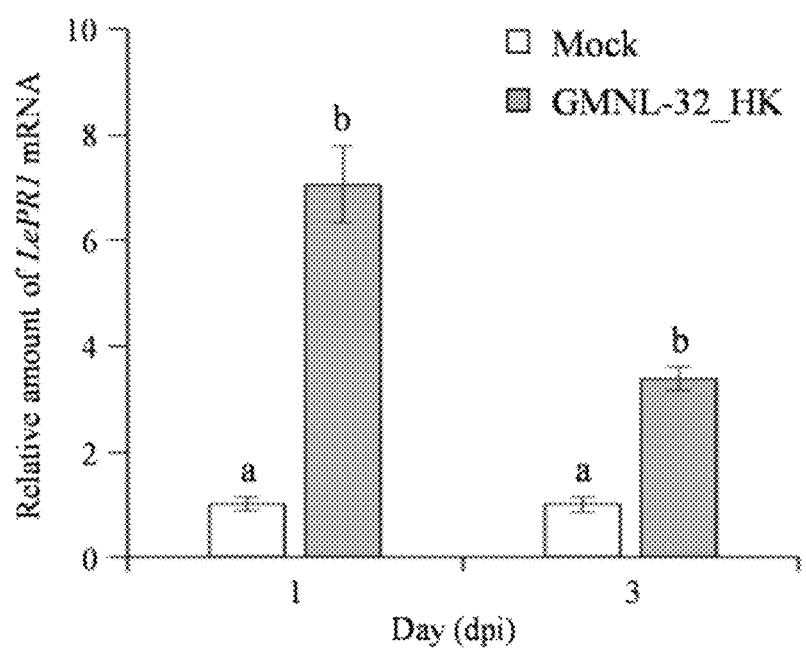

6.2 Assessment of Effect of Plant Growth Regulator of Elevating Signaling pathways Related to Salicylic Acid of Tomato Plant Referring to FIGS. 10A and 10B, these figures show bar diagrams of LePR1 gene mRNA relative content of a tomato plant treated with the plant growth regulator in accordance with one embodiment of the present invention.

It was shown by results in FIGS. 10A and 10B that, when setting the mRNA expression level of LePR1 in the mock group as 1.0, the tomato plant that was treated with the *Lactobacillus paracasei* GMNL-32 fermenting culture solution (as shown in FIG. 10A) or *Lactobacillus paracasei* GMNL-32 thermally sterilized fermenting culture solution (as shown in FIG. 10B) for 1 day sees the expression of SA regulatory gene LePR1 in its leaf higher than that of the mock group. However, after the treatment of 3 days, the LePR1 expression level inside the tomato plant that was treated with the *Lactobacillus paracasei* GMNL-32 thermally sterilized fermenting culture solution (as shown in FIG. 10B) still had a significant difference from that of the mock group, indicating that the plant treatment by the *Lactobacillus paracasei* GMNL-32 fermenting culture solution could indeed activate anti-disease paths related to salicylic acid (SA) inside the plant.

The aforementioned result shows that, in the case of the tomato served as the plant model in the present invention, it was proven that the treatment by the fermenting culture solution or thermally sterilized fermenting culture solution of *Lactobacillus paracasei* GMNL-32 could indeed elevate the anti-biotic stress of the plant [including inhibition of the infection of *Colletotrichum gloeosporioides, Pseudomonas syringae* pv. Tomato DC30000 (Pst DC3000), and non-virulent strain of *Pseudomonas syringae* pv. Tomato DC3000 avrRpt2 (Pst DC3000 avrRpt2) to the tomato plant] ability and anti-abiotic stress (including the elevated temperature, UV exposure, and drought) ability. However, the elevation of the anti-disease ability of the plant could be elevation of resistance against biotic (i.e., pathogen) and abiotic (i.e., environments) stresses through maintaining the ability of rhizobacteria wrapping around the plant root, effectively increasing the hydrogen peroxide content and peroxidase activity inside the plant, substantially expressing anti-disease related genes (including regulatory genes LeOPR3, LeCOI1, LeJAZ1 in signaling pathways related to jasmonic acid, and regulatory gene LePR1 in signaling pathways related to salicylic acid), thus making the plant more capable to adapt to stresses or climate changes.

Supplementally, *Lactobacillus paracasei* GMNL-32 used in the present invention was originally isolated from human gastrointestinal tracts, and the aforementioned experiments proved that the fermenting culture solution or thermally sterilized fermenting culture solution of *Lactobacillus paracasei* GMNL-32 had excellent thermal stability (the protection effect not influenced by thermal sterilization treatment), safety without side effect, which indeed had the potential to be applied in the plant growth regulator or plant liquid fertilizers including the same.

In summary, although the plant growth regulator of elevating the anti-stress ability in the present invention and the use thereof are illustrated by using specific strains, specific dosage forms, specific subjects, specific treatments, or specific assessment methods as examples in the present invention, any one of ordinary skills in the art of the present invention could know that the present invention is not limited thereto, and the present invention could also be, without departing from the spirit and scope of the present invention, implemented by using other strains, other dosage forms, other subjects, other treatments or other assessment methods.

For example, the plant growth regulator of the present invention could be treated to the whole body, a portion, or a cultivation medium of another dicot (such as Caricaceae *papaya*) or monocot (such as rice), in order to elevate the ability of the plant against biotic and abiotic stresses. In addition, the plant growth regulator of the present invention could be in dosage forms of liquids, powders, pastes, blocks, tablets, capsules, or in combination with other suitable carriers rather than limiting the present invention thereto.

It can be known from the aforementioned embodiments that, the plant growth regulator of elevating anti-stress ability in the present invention and the use thereof have the advantage that this plant growth regulator is consisted of the fermenting culture solution of *Lactobacillus paracasei*, has excellent thermal stability, safety without side effect, can significantly elevate the ability of the plant against biotic and abiotic stresses, and thus is used for the application in the plant growth regulator or the method for elevating anti-stress ability of a plant using the plant growth regulator composition including *Lactobacillus* fermenting culture solution.

Although the present invention has been disclosed in several embodiments as above mentioned, these embodiments do not intend to limit the present invention. Various changes and modifications can be made by those of ordinary skills in the art of the present invention, without departing from the spirit and scope of the present invention. Therefore, the claimed scope of the present invention shall be defined by the appended claims.

What is claimed is:

1. A method for elevating anti-stress ability of a plant using a plant growth regulator composition including *Lactobacillus* fermenting culture solution, comprising administering a *Lactobacillus* fermenting culture solution to a whole body, a portion and/or a culture medium of a plant, the *Lactobacillus* fermenting culture solution consisting of a thermally sterilized fermenting culture solution consisting of a *Lactobacillus paracasei* GMNL-32 fermentation culture stock solution treated under 90° C. to 121° C. for 15 minutes to 30 minutes, wherein the *Lactobacillus* fermenting culture solution is a 10-fold dilution of the *Lactobacillus paracasei* GMNL-32 fermentation culture stock solution, and the *Lactobacillus paracasei* GMNL-32 is deposited with an accession number of CCTCC M 204012 in China Center for Type Culture Collection (CCTCC), Wuhan University, Wuhan 430072, People's Republic of China, on Feb. 19, 2004, thereby elevating an ability against biotic stresses of the plant, wherein the biotic stress comprises an infection of a pathogen, the pathogen consists of *Colletotrichum* species, and the *Colletotrichum* species comprises *Colletotrichum gloeosporioides*.

2. The method for elevating anti-stress ability of a plant using a plant growth regulator composition including *Lactobacillus* fermenting culture solution of claim 1, wherein the plant is a dicot or a monocot.

3. The method for elevating anti-stress ability of a plant using a plant growth regulator composition including *Lactobacillus* fermenting culture solution of claim 2, wherein the dicot is Solanaceae species or Caricaceae species.

4. The method for elevating anti-stress ability of a plant using a plant growth regulator composition including *Lactobacillus* fermenting culture solution of claim 3, wherein the Solanaceae species is tomato.

5. The method for elevating anti-stress ability of a plant using a plant growth regulator composition including *Lactobacillus* fermenting culture solution of claim 3, wherein the Caricaceae species is *papaya*.

6. The method for elevating anti-stress ability of a plant using a plant growth regulator composition including *Lactobacillus* fermenting culture solution of claim 3, wherein the monocot is rice.

7. The method for elevating anti-stress ability of a plant using a plant growth regulator composition including *Lactobacillus* fermenting culture solution of claim 1, wherein the portion comprises a leaf, a stem, and/or a root.

8. The method for elevating anti-stress ability of a plant using a plant growth regulator composition including *Lactobacillus* fermenting culture solution of claim 1, wherein the culture medium is selected from a group consisting of water, soil, cultivatable soil, expanded clay, bark, artificial soil, granulate sponge, vermiculite, nacrite, fern chip, zeolite, sphagnum moss and any combination thereof.

* * * * *

SEQUENCE LISTING

```
<160> NUMBER OF SEQ ID NOS: 13

<210> SEQ ID NO 1
<211> LENGTH: 20
<212> TYPE: DNA
<213> ORGANISM: Artificial sequence
<220> FEATURE:
<223> OTHER INFORMATION: forward primer(PAF)

<400> SEQUENCE: 1
agagtttgat cctggctcag                                               20

<210> SEQ ID NO 2
<211> LENGTH: 18
<212> TYPE: DNA
<213> ORGANISM: Artificial sequence
<220> FEATURE:
<223> OTHER INFORMATION: forward primer(536R)

<400> SEQUENCE: 2
gtattaccgc ggctgctg                                                 18

<210> SEQ ID NO 3
<211> LENGTH: 521
<212> TYPE: DNA
<213> ORGANISM: Artificial sequence
```

```
<220> FEATURE:
<223> OTHER INFORMATION: 16S rDNA partial sequence of Lactobacillus
      paracasei

<400> SEQUENCE: 3
tctgcggtgc ctatacatgc aagtcgtacg cactggccca actgattgat ggtgcttgca     60
cctgattgac gatggatcac cagtgagtgg cggacgggtg agtaacacgt aggtaacctg    120
ccccggagcg ggggataaca tttgaaaaca gatgctaata ccgcataaca acaaaagcca    180
catggctttt gtttgaaaga tggctttggc tatcactctg ggatggacct gcggtgcatt    240
agctagttgg taaggtaacg gcttaccaag gcgatgatgc atagccgagt tgagagactg    300
atcggccaca atggaactga gacacggtcc atactcctac gggaggcagc agtagggaat    360
cttccacaat gggcgcaagc ctgatggagc aacaccgcgt gagtgaagaa gggtttcggc    420
tcgtaaagct ctgttgttgg agaagaacgt gcgtgagagt aactgttcac gcagtgacgg    480
tatccaacca gaaagtcacg gctaactacg tgccagatgg g                        521

<210> SEQ ID NO 4
<211> LENGTH: 22
<212> TYPE: DNA
<213> ORGANISM: Artificial sequence
<220> FEATURE:
<223> OTHER INFORMATION: forward primer (LeOPR3)

<400> SEQUENCE: 4
ttggcttagc agttgttgaa ag                                              22

<210> SEQ ID NO 5
<211> LENGTH: 22
<212> TYPE: DNA
<213> ORGANISM: Artificial sequence
<220> FEATURE:
<223> OTHER INFORMATION: reverse primer (LeOPR3)

<400> SEQUENCE: 5
tacgtatcgt ggctgtgtta ca                                              22

<210> SEQ ID NO 6
<211> LENGTH: 20
<212> TYPE: DNA
<213> ORGANISM: Artificial sequence
<220> FEATURE:
<223> OTHER INFORMATION: forward primer (LeCOI1)

<400> SEQUENCE: 6
atgggcgagc catcgctaag                                                 20

<210> SEQ ID NO 7
<211> LENGTH: 20
<212> TYPE: DNA
<213> ORGANISM: Artificial sequence
<220> FEATURE:
<223> OTHER INFORMATION: reverse primer (LeCOI1)

<400> SEQUENCE: 7
agccctggct accttgcagc                                                 20

<210> SEQ ID NO 8
<211> LENGTH: 20
<212> TYPE: DNA
<213> ORGANISM: Artificial sequence
<220> FEATURE:
<223> OTHER INFORMATION: forward primer (LeJAZ1)
```

```
<400> SEQUENCE: 8
cgtccgttga aacaaatcct                                                  20

<210> SEQ ID NO 9
<211> LENGTH: 20
<212> TYPE: DNA
<213> ORGANISM: Artificial sequence
<220> FEATURE:
<223> OTHER INFORMATION: reverse primer (LeJAZ1)

<400> SEQUENCE: 9
ggggttctgt ttgttggcta                                                  20

<210> SEQ ID NO 10
<211> LENGTH: 19
<212> TYPE: DNA
<213> ORGANISM: Artificial sequence
<220> FEATURE:
<223> OTHER INFORMATION: forward primer (LePR1)

<400> SEQUENCE: 10
ccgtgcaatt gtgggtgtc                                                   19

<210> SEQ ID NO 11
<211> LENGTH: 19
<212> TYPE: DNA
<213> ORGANISM: Artificial sequence
<220> FEATURE:
<223> OTHER INFORMATION: reverse primer (LePR1)

<400> SEQUENCE: 11
gagttgcgcc agactactt                                                   19

<210> SEQ ID NO 12
<211> LENGTH: 22
<212> TYPE: DNA
<213> ORGANISM: Artificial sequence
<220> FEATURE:
<223> OTHER INFORMATION: forward primer (ef1?ü

<400> SEQUENCE: 12
agcccccttc gtcttccact tc                                               22

<210> SEQ ID NO 13
<211> LENGTH: 21
<212> TYPE: DNA
<213> ORGANISM: Artificial sequence
<220> FEATURE:
<223> OTHER INFORMATION: reverse primer (ef1?ü

<400> SEQUENCE: 13
accagtctca acacgtccca c                                                21
```